Aug. 19, 1941.    A. L. RICHE    2,253,049
METHOD AND APPARATUS FOR AUTOMATICALLY TESTING FLUIDS
Original Filed June 10, 1929    2 Sheets-Sheet 1
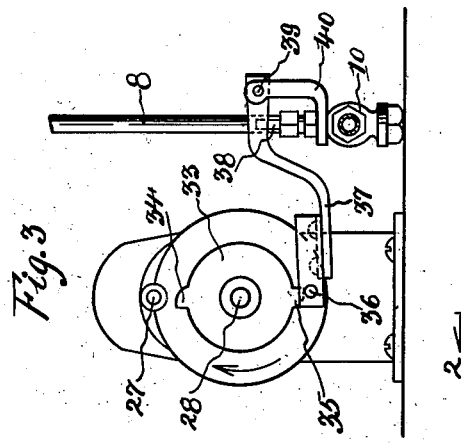
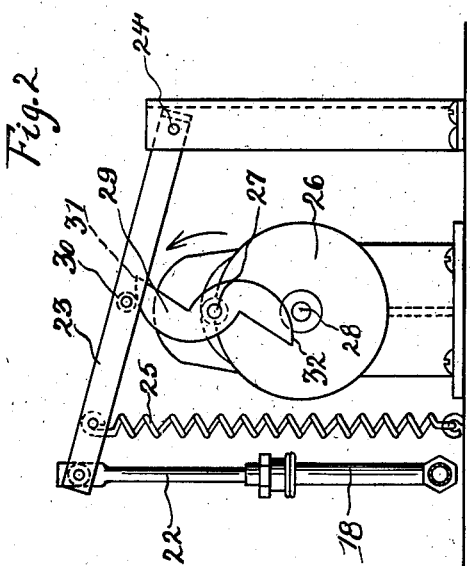
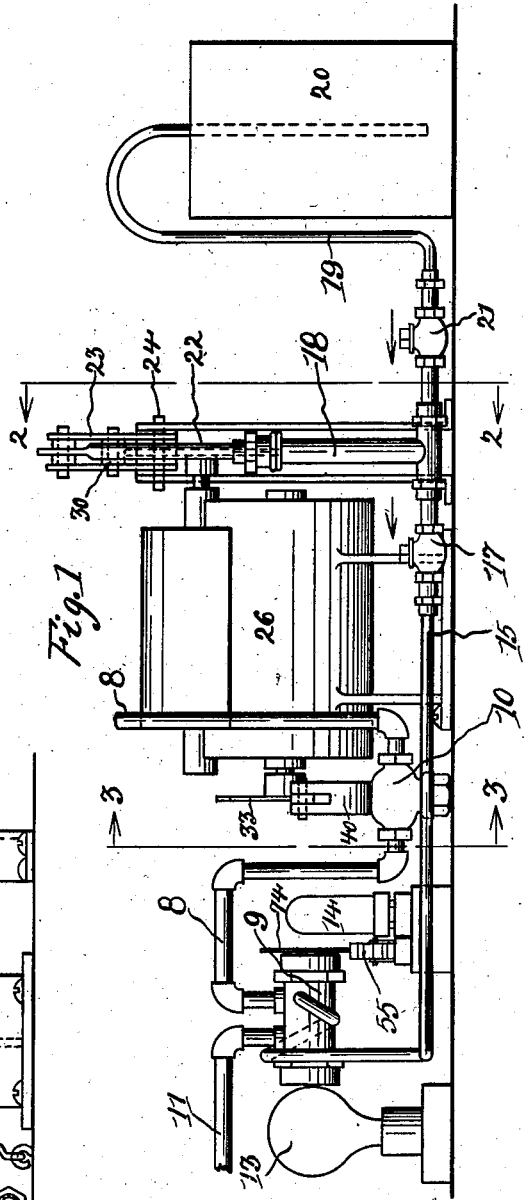
Inventor
Arthur L. Riche
By Stryker & Stryker
Attorneys

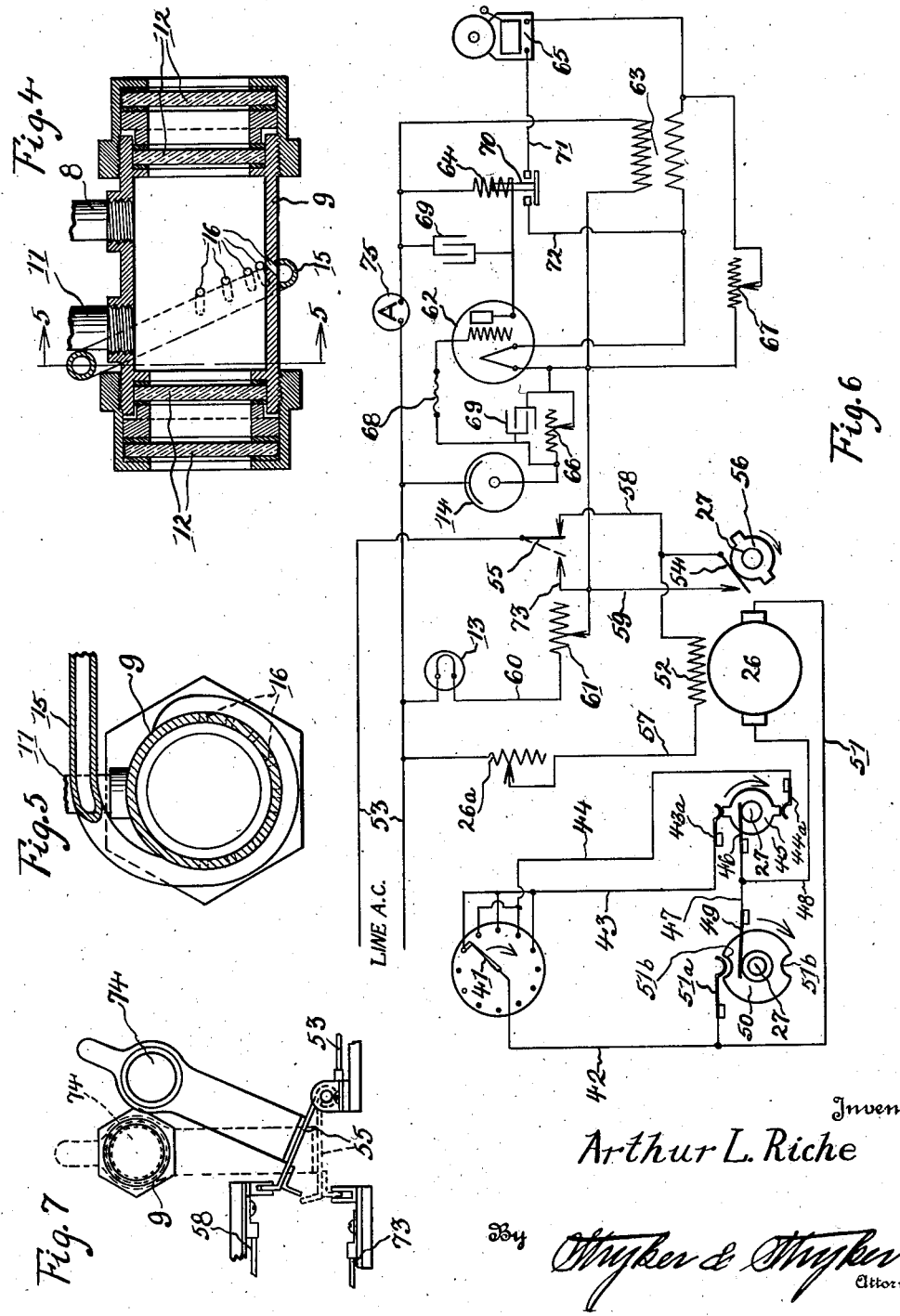

Patented Aug. 19, 1941

2,253,049

UNITED STATES PATENT OFFICE 2,253,049

METHOD AND APPARATUS FOR AUTOMATICALLY TESTING FLUIDS

Arthur L. Riche, St. Paul, Minn.

Application June 10, 1929, Serial No. 369,592
Renewed July 13, 1936

22 Claims. (Cl. 23—230)

This invention relates to means and a method for automatically indicating changes in the condition of fluids and is adapted for numerous uses such as testing for the hardness of water, detecting an excess of regenerating fluid or brine in the softened water after regeneration and indicating changes in the turbidity or light absorption characteristics of the intake and effluent of mechanical filters and chemical treating plants.

It is my object to provide automatically operating means for making tests of measured quantities of fluid at predetermined intervals, and for adding a reagent to the sample when required. Another object is to provide apparatus adapted to segregate the sample to be tested from the body of the fluid and to thoroughly mix with such separate sample a reagent adapted to produce turbidity or other change in the light absorption characteristic, such as a change in color, in the presence of the substance tested for, an interval of time being allowed for reaction between the reagent and sample before making the test or indicating the result of such test. Other objects will appear and be more fully pointed out in the following specification and claims.

The invention will be particularly described with reference to water softening apparatus of the zeolitic type in which the softened water is periodically tested for hardness and after regeneration of the softening material, the water is tested for salt content. In the operation of water softening plants requiring regeneration, it is common practice to provide a meter for indicating when a predetermined quantity of water has been softened, but because of variations in the hardness of the water, and lack of care on the part of the operator, it frequently occurs that the hardness is allowed to become excessive before regeneration, with consequent loss to the user, or the full capacity of the zeolites are not utilized before regeneration is effected. In laundries expensive additions to the soap are required when the hardness becomes excessive, or when an excess of brine is allowed to remain in the softener, and in case of boiler feed water softeners and ice manufacturers the consequences of failure to regenerate and wash the zeolites are even more serious. Moreover, economical use of salt requires a utilization of substantially the full capacity of the zeolites before regeneration, and after regeneration the softener should be thoroughly washed, but an excess of washing results in a loss of wash water and reduced softening capacity for the run. It is thus important in the operation of water softening plants to give an alarm promptly and automatically when the hardness of the product increases beyond a predetermined minimum and, after regeneration, to indicate when the washing operation is complete.

By my improved apparatus an accurately measured sample of the softened water is automatically segregated at a predetermined time and into this sample a measured quantity of a reagent is injected so as to be thoroughly mixed with the water. After a further period, during which the reagent is allowed to combine with the hardening salts in the water to produce a change in the light absorption characteristic in proportion to the hardness, my device completes the test by registering the change or indicating by a signal, either audible or visual, when the change in characteristic has reached a predetermined point. My device may also be employed to automatically actuate valves for controlling the regeneration, as well as, or instead of, signals. An interval of time is required for the reaction between the reagent and hardening salts, and my improved apparatus is designed to allow for such interval before the change in light absorption characteristic is recorded or a test made. I have found that the most accurate indication of change can be secured by the use of a photo-electric cell in connection with a suitable source of light, electrical amplification and signal or control circuits.

The invention will be best understood by reference to the accompanying drawings in which Figure 1 is a side elevation showing the apparatus for periodically segregating a sample to be tested and for injecting the reagent and also showing the relation of the observation cell to the source of light and photo-electric cell; Fig. 2 is a section taken on the line 2—2 of Fig. 1 particularly showing the reagent pump and operating mechanism; Fig. 3 is a section taken on the line 3—3 of Fig. 1 showing the liquid control valve and operating mechanism; Fig. 4 is an enlarged, central vertical section through the observation cell; Fig. 5 is a section taken on the line 5—5 of Fig. 4; Fig. 6 is a wiring diagram showing suitable electrical apparatus for carrying out my invention; Fig. 7 is a detail view of the test screen and switch, showing their positions relative to the observation cell.

As shown in the drawings, I provide a small pipe 8 adapted to be connected to a source of the soft water or other fluid to be tested. The pipe 8 delivers the water to an observation cell 9 and the flow to the cell is controlled by a valve 10 in the pipe 8. An outlet pipe 11 from the cell 9 communicates with the top of the cell and is arranged to retain a measured sample of the water in the cell when the supply is cut off at the valve 10. As best shown in Figs. 4 and 5, the cell 9 is substantially cylindrical in shape, being disposed with its axis horizontal. The ends of the cell 9 are provided with double lenses 12 arranged to transmit light from a suitable source 13 through the sample and to a photo-electric cell 14 or other element responsive to the change in the light absorption characteristic of the sample in the cell 9. The inflowing water from the pipe 8 is directed downward from the top of the cell 9 near one end and the outgoing water passes upward near the opposite end into the pipe 11. By this arrangement, the entire contents of the cell may be changed or replaced quickly, without leaving pockets which might retain the reagent or previously tested sample.

A suitable reagent for use in testing the sample in the cell 9 is introduced into said cell through a pipe 15 which extends spirally around the cell and communicates therewith through a series of small openings 16. The inflowing reagent from the openings 16 is directed into the lower periphery of the cell 9 and in such a direction as to produce a maximum of agitation with resulting thorough mixing of the reagent and sample to be tested. The reagent pipe 15 has a check valve 17 and is supplied with the reagent from a pump 18. This pump is in turn supplied with the reagent through a pipe 19 extending to a reservoir 20, a check valve 21 being provided in the pipe 19 to allow flow only toward the pump. A piston rod 22 for operating the piston in the pump 18 is connected to one end of a rocker arm 23 having a pivotal support 24 at its opposite end. The piston is normally drawn downward within the pump 18 by a coiled spring 25 connected to the arm 23 and the pump is actuated by an electric motor 26. The motor is arranged to drive, through suitable speed reducing gears within the motor casing, shafts 27 and 28. Fixed on one end of the shaft 27 is a cam 29 disposed in operative relation to a roller 30 on the arm 23. The cam 29 is formed with projections 31 and 32 from which the roller 30 drops abruptly when the shaft 27 is rotated in the direction indicated by an arrow in Fig. 2 so that in the arrangement shown, the pump 18 is operated to inject a quantity of reagent twice during each complete revolution of the shaft 27.

To periodically actuate the valve 10 a cam 33 is fixed on the shaft 28 and formed with projections 34 and 35. A pin 36 is disposed on a lever arm 37 in the path of the projections 34 and 35 and a spring within the casing of the valve 10 normally holds it in closed position. The valve stem engages the arm 37 to urge it upward, with a supporting pivot 39 as a fulcrum, and in such a position that the pin 36 is retained in the path of the projections 34 and 35. A suitable bracket 40 is secured to the valve 10 to support the arm 37. Thus the valve 10 is held in open position when the pin 36 is in engagement with one of the projections 34 and 35, as shown in Fig. 3 and is closed when the shaft 28 is rotated to remove said projections from the pin 36.

Suitable electric control circuits and apparatus for indicating changes in the light absorption characteristic such as changes in the turbidity or color of the sample in the cell 9 are shown in Fig. 6. The motor 26 is of the type in common use in heat regulator circuits, such as that described in United States Patent No. 1,078,438 to Charles B. Hoffmann, for Repulsion motor control system, dated November 11, 1913. The starting of the motor may be controlled by a clock or other automatic means for operating a switch element 41 adapted to alternately complete the circuit between a wire 42 and wires 43 and 44 respectively. Where the device is used upon a water softener operating with water of ordinary hardness (having approximately 2 parts of calcium salts to one part magnesium salts as the hardening substance) the clock switch 41 is arranged to close the motor circuit so as to effect tests at five minute intervals. With such arrangement, I have secured excellent results by the use of a motor 26 having the shafts 27 and 28 geared so as to turn one-half revolution in one minute. Upon the shaft 27 is fixed a cam or contact element 45 having two projections which in the position shown in Fig. 6 make contact with brushes 43a and 44a constituting terminals of the wires 43 and 44 respectively. A brush 46 connects the element 45 with a motor circuit wire 48. Thus the circuit from the wires 43 or 44 to wire 48 is complete only when the projections on the element 45 are in engagement with the brushes 43a and 44a. A branch 47 of the motor circuit 48 includes a brush 49 in continuous connection with the cam 50, a brush 51a and another motor circuit wire 51, the latter wire being also connected to the wire 42. Notches or reentrant segments 51b in the periphery of the cam 50 are arranged to open the circuit between the cam and brush 51a upon a half revolution of the shaft 27.

It will be understood that branches of the wires 43 and 44 have contact terminals at five minute intervals entirely around the clock dial, although the connections with only a few such terminals are illustrated. The element 41 carries a brush which successively engages the terminals of the wires 43 and 44. Thus the motor 26 is started at five minute intervals by the closing of the circuit between wires 42 and 43, or between wires 42 and 44. With the element 45 in the position shown in Fig. 6 closing the circuit between the wires 42 and 44 by the action of the moving element 41 starts the motor and as soon as the cam 50 engages the brush 51a (which occurs shortly following the start) the motor continues to turn the shaft 27 for one-half revolution irrespective of whether or not the circuit remains closed between the wires 42 and 44. Upon the completion of a half turn, the circuit between the wires 48 and 51 is opened by movement of the cam 50 out of engagement with the brush 51a. When the motor stops and the cams 29 and 33 are in positions corresponding to those indicated in Figs. 2 and 3, another half revolution of the shafts 27 and 28 is effected by the closing of the circuit at the element 41 between the wires 42 and 43. In the arrangement illustrated, the element 41 is continuously moved by clock mechanism of well known construction, but equivalent or suitable means for automatically and periodically closing the circuit may be substituted for the clock within the spirit of my invention.

My electrical indicating or testing means, responsive to the turbidity or color changes in the contents of the cell 9, is under control of a motor operated switch 54 and a test switch 55. A cam 56 fixed on the shaft 27 within the motor casing is arranged to close the switch 54 at a predetermined interval of time after the motor has been started and the test switch 55 is normally closed, as indicated in Fig. 6. These control switches 54 and 55 are in series with the line wires 53 and with wires 58, 59 and 60 and this circuit includes the lamp 13 and a variable resistance 61. Movement of the variable resistance 61 serves to vary the light emission of the lamp 13 and thereby change the light flux incident upon the photo-electric cell so that the measuring range of the testing means may be changed. Other circuits under control of the switches 54 and 55 include the photo-electric cell 14, a suitable stage of amplification (comprising a tube 62), a transformer 63, a relay 64 and a signal 65. Suitable variable resistances 66 and 67 are placed respectively in the circuits between the photo-electric cell 14 and tube 62 and between said cell and the signal 65. A grid leak 68 of any suitable type is provided as well as the required condensers 69. A branch circuit 57 includes the motor windings 52, and a variable resistance 26a constituting a speed control for the motor 26.

As the particular circuits and arrangements for amplifying the current from the photo-electric cell form no part of this invention and suitable circuits are well known to those skilled in the art, further detailed description of the circuits shown will be unnecessary. It is sufficient to add that the relay 64 receives current which is variable inversely according to the light directed upon the photo-electric cell 14 and upon increase in said current above a predetermined point (by increase in the turbidity or change in color of the light reaching the cell) the armature 70 of the relay 64 is raised to complete the signal circuit between the wires 71 and 72. Thus an excess of turbidity or change in color renders the signal operative. A milli-ammeter 75 in the output circuit indicates the condition of each sample so that the operator is always advised of the condition of the fluid.

The test switch 55, which is normally closed to complete the circuit between the wires 53 and 58, is arranged to be moved to complete a shunt circuit 73 for the switch 54. As best shown in Fig. 7, the movable element of the switch 55 is connected to a screen 74 adapted to be moved between the observation cell 9 and photo-electric cell 14 when the shunt circuit 73 is closed. This screen 74 is sufficiently opaque to reproduce the color for shielding effect of the minimum turbidity required to render the indicator or signal operative.

Operation

When no test is being made the fluid to be tested passes continuously through the cell 9 from the pipe 8 and is discharged through the pipe 11. In the embodiment shown, the clock-operated element 41 automatically starts the motor 26 at five minute intervals and the motor continues to operate for one minute during which time each of the shafts 27 and 28 is rotated one-half revolution in the direction indicated by arrows in Figs. 2 and 3. Starting from the positions indicated in Figs. 2 and 3 rotation of the cams 29 and 33 first causes the pin 36 to be released by the projection 35 so that the valve 10 closes and cuts off the supply of fluid to be tested, leaving a measured sample in the observation cell 9. Immediately following the closing of the valve 10 the roller 30 drops from the projection 31 of the cam 29 and under the action of the spring 25 the pump 18 is operated to force a measured quantity of reagent from the reservoir 20 into the cell 9. The openings 16 insure thorough mixing of the reagent with the sample to be tested and so direct the reagent that a minimum of it passes out through the pipe 11, the displaced fluid being largely water. Now while the shafts 27 and 28 continue to rotate, a period of about 45 seconds is allowed for the reaction or combination of the reagent with the hardening salts in the water, this period being sufficient to allow for the development of sufficient color change or turbidity in water other than that of unusual composition. At the end of this period for reaction, one of the projections on the cam 56 closes the switch 54 and completes the indicator circuits, including the lamp 13, photo-electric cell 14, amplification, relay and ammeter. Light from the lamp 13 passes through the sample in the observation cell 9 and is directed upon the photo-electric cell 14. The current through the relay being responsive to the light impressed on the photo-electric cell 14, a reduction or change in color of the light to a predetermined point, such as would be caused by excessive hardness, causes the relay armature 70 to complete the alarm circuit. However, if the water in the observation cell is free from excessive quantities of hardening salts the turbidity or color change will be insufficient to cause a change in the position of the relay armature such as that required to give a warning signal. For every test the ammeter 75 indicates the condition of the sample.

During the operation of the motor and immediately following the injection of the reagent by the pump 18, the reagent for the succeeding injection is drawn into the pump by the operation of the cam 29, the roller 30 being slowly raised upon one of the projections 31 and 32. Just before the motor is stopped at the end of a half revolution of the shaft 28, one of the projections 34 and 35 on the cam 33 depresses the arm 37 and restores the valve 10 to normal open position so that the outlet water from the softener, or other fluid to be tested, is passed through the cell 9, washing out the sample and reagent of the preceeding test through the pipe 11.

When it is desired to place the system in operation, and in order to ascertain whether it is in proper working order, the operator merely moves the screen 74 to the dotted line position shown in Fig. 7 thus closing the shunt circuit 73 and reproducing the effect, upon the photo-electric cell 14, of the turbidity or color change required to sound the signal 65. If the signal 65 operates upon the closing of the shunt circuit 73 and movement of the screen 74 between the observation cell 9 and photo-electric cell 14, the operator knows that the system is in proper working order.

It will be evident that numerous changes may be made in the arrangement of parts and timing of the operations without departing from the spirit of my invention. Where the device is used in connection with a water softener of the zeolitic type in which brine is introduced to periodically regenerate the zeolites, my device affords automatic means for determining when the washing out of the spent brine after regeneration has progressed sufficiently for soap economy or for freedom from ill effect when the water is used in a boiler, artificial ice plant or elsewhere. An excess of salt in the effluent water produces, in the presence of a proper amount of reagent in the observation cell 9, a color change and/or turbidity similar to that produced by hardening salts, due to reaction of the reagent with impurities carried by the salt and/or the exhausted brine.

Another important application of my device is for testing and making automatic record of the turbidity of water or of the turbidity or changes in color of other fluids in connection with mechanical filters, chemical coagulation plants and similar uses. It is important in many mechanical filter and chemical treating plants to indicate changes in the turbidity or color of the effluent and intake. For such use my mechanism for injecting reagent into the segregated sample in the observation cell 9 may be eliminated and the relay 64 and signal 65 may be eliminated and a recording milli-ammeter used of any suitable or well known construction. For such use an additional stage or stages of amplification may be required.

It will now be understood that the outstanding, important features of my device are the arrangements for making intermittent or periodical tests of segregated samples and for allowing an interval of time between the intake of a sample and the actual test, or indication responsive to the turbidity or color change of the sample. These features of my invention promote accuracy and uniformity of results because where a reagent is added to the sample a period of time is required for the completion of the reaction and in case of tests without the addition of a reagent such as those in connection with mechanical filters, chemical treating, etc., the delay after the separation of the test sample allows dissolved gases, bubbles and the like to clear away and gross particles to settle out, thus automatically bringing the successive samples to a uniform condition. Furthermore, the construction is such that the segregated sample may be a "grab" sample or a sample representing the water as it flows by a given point at a particular instance, as distinguished from a "drip" sample, which represents the average composition of the liquid through a predetermined period of time.

Obviously, the frequency of the tests and period between the segregation of the sample and closing of the test circuits may be varied between wide limits without departing from the spirit of my invention. As above pointed out, in the case of water in which hardness is approximately one-third due to magnesium salts and two-thirds due to calcium salts, I have found that one minute between the injection of reagent and finish of the test gives closer, more accurate results than is required commercially. Where waters higher in magnesium are to be tested this time interval is increased either by slowing the motor with the resistance 26a shown in Fig. 6, or by removing one of the projections 31 or 32 of the cam 29, one of the projections 34 or 35 of the cam 33, and one of the projections of the cam 56. Without other change, the removal of such cam projections would cause a sample to remain in the observation cell for a period of five minutes. Five minutes is ample for reaching an end point in a test for magnesium at ordinary water temperatures.

I have found that a suitable reagent for use in testing the hardness of water is a standard six per cent solution of potassium salts of non-volatile, fatty acids (of which corn oil has been found preferable) held in permanent solution by the addition of a sugar or glycerol, and filtered at low temperature. About ten per cent of such reagent is sufficient for tests of waters of ordinary hardness in the observation cell 9. This reagent when acted upon by the hardening salts or calcium chloride transmits a reddish brown light by which the photo-electric cell is affected and the resulting change from the white light gives a decided increase in the output of the amplifying tube.

Having described my invention what I claim is new and desire to protect by Letters Patent is:

1. Automatic testing apparatus for fluids comprising means for intermittently segregating a measured sample of said fluid, means for injecting a test reagent into said sample, in a manner to produce thorough mixing and testing means responsive to a change in the light absorption characteristic of said sample for indicating said change.

2. The apparatus specified in claim 1 in which control means are provided for delaying the operation of said testing means for a determined period after the operation of said segregating means.

3. Testing apparatus for fluids, subject to change, comprising an observation cell, connections for continuously passing the fluid to be tested through said cell, a valve in one of said connections for cutting off the supply of fluid to said cell, said connections being arranged to retain a measured sample of the fluid in said cell when said valve is closed, a motor for operating said valve, time control means for operating said motor to periodically close said valve and electrical testing means responsive to the light absorption characteristic of a sample in said cell for indicating the degree of change in said sample.

4. The combination with a source of fluid to be tested and a source of reagent for testing the same, of an observation cell, means for passing said fluid through said cell, said means being arranged to retain a measured sample in said cell when the supply of fluid is cut off, power driven means for periodically cutting off the supply of fluid to said cell, power driven means for supplying a measured quantity of said reagent to the sample in said cell and calibrated visual indicating means responsive to the light absorption characteristic of the sample in said cell to indicate the result of the test.

5. Testing apparatus for liquids subject to change comprising an observation cell, means for effecting a continuous flow of the liquid therethrough, means for periodically interrupting the flow of liquid through said cell to retain a sample of said liquid therein, means for adding a test reagent to said sample, and electrical means for measuring the change in the light absorption characteristic of the sample due to said reagent.

6. Testing apparatus for liquids subject to change comprising an observation cell, means for effecting a continuous flow of the liquid therethrough, means for periodically interrupting the flow of liquid through said cell to retain a sample of said liquid therein, means for adding a test reagent to said sample, electrical means for testing the light absorption characteristic of the sample, and means for controlling the operation of said testing means in timed relation to the addition of said reagent.

7. Automatic testing apparatus for determining a chemical characteristic of a liquid comprising, means for segregating a sample of said liquid, means for mixing with said segregated sample a test reagent capable of producing turbidity in said sample proportional to said chemical characteristic, light sensitive means for measuring the amount of such turbidity, and means for delaying the operation of said light sensitive means a predetermined period after the mixing of said sample.

8. Automatic testing apparatus for intermittently and quantitatively testing water for hardness comprising, time controlled means for selecting a sample of said water and for mixing a test reagent therewith capable of producing a physically perceptible change in said sample proportional to the hardness thereof, testing means responsive to the changes in the light absorption characteristics of said sample to indicate the hardness of said water, and means for delaying the operation of said testing means a predetermined period after the addition of said reagent to allow the sample to come to a standard testing condition.

9. Automatic testing apparatus for determining a chemical characteristic of a liquid comprising, an observation cell, means for providing a continuous flow of liquid to be tested through said cell, means to periodically interrupt the flow of liquid to segregate a sample in said cell, means for mixing a test reagent with said sample capable of producing a change in the light absorption characteristic of the sample, and testing means operated in timed relation to said segregating means for measuring said change, to measure said chemical characteristics at predetermined intervals.

10. Automatic testing apparatus for determining a chemical characteristic of a liquid comprising, means for adding a test reagent capable of producing turbidity in said liquid proportional to said chemical characteristics, testing means including a light sensitive element for measuring the amount of said change, relay mechanism adapted to be operated by the light sensitive element upon a predetermined change in the light absorption characteristics of the sample, and manually operated means for calibrating the testing means comprising a light filter and means for varying the light flux incident on the light sensitive element.

11. In automatic testing apparatus for determining a chemical characteristic of a liquid having means for adding a test reagent capable of producing turbidity in said liquid proportional to said chemical characteristics, testing means including a light sensitive element for measuring the amount of said change, and relay mechanism adapted to be operated by the light sensitive element upon a predetermined change in the light absorption characteristic of the sample, manually operable means for calibrating the testing means comprising, a light filter and means for varying the light flux incident on the light sensitive element.

12. Testing apparatus for liquid subject to change comprising an observation cell, means for keeping the surface of the observation cell continuously wet to prevent drying of solids thereon from the fluid, means for periodically selecting a sample in said cell, means for adding a test reagent to said sample, and electrical means for measuring the change in the light absorption characteristics of the sample due to said reagent.

13. Testing apparatus for fluids subject to change comprising an observation cell, connections for passing the fluid to be tested through said cell, means for periodically cutting off the supply of fluid to said cell, said connections being arranged to retain a measured sample in said cell when the supply is cut off, electrical means for testing the light absorption characteristic of the sample retained in said cell, means for reestablishing the flow of fluid through said cell, and control means for delaying the operation of said electrical testing means for a predetermined interval of time after the supply of fluid to said cell has been cut off.

14. The combination with a source of fluid to be tested and a source of reagent for testing the same, of an observation cell, means for passing said fluid through said cell, said means being arranged to retain a measured sample in said cell when the supply of fluid is cut off, power driven means for periodically cutting off the supply of fluid to said cell, power driven means for supplying a measured quantity of said reagent to the sample in said cell, indicating means responsive to the light absorption characteristic of the sample in said cell to indicate the result of the test, and automatically operating controls adapted to successively operate said fluid cut-off, reagent supply and indicating means, said controls being arranged to operate said indicating means upon the lapse of a predetermined time after the operation of said reagent supply to allow time for the reaction between the reagent and fluid to be tested.

15. Automatic testing apparatus for fluids comprising an observation cell, means for intermittently segregating a measured sample of said fluid in said cell, testing means responsive to the light absorption characteristic of said sample for indicating the degree of change in said characteristic, means for periodically rendering said testing means operative in timed relation to said segregating means, means for forcibly injecting a test reagent into the segregated sample in said cell to cause thorough and rapid mixing therewith, and means for actuating said injecting means subsequent to the operation of said segregating means and prior to the operation of said testing means.

16. Testing apparatus for liquid subject to change comprising an observation cell for confining a sample of the fluid with substantially no free surface from which light may be reflected, means for periodically selecting a sample in said cell, means for adding a test reagent to the selected sample, and electrical means for testing the light absorption characteristic of the sample due to said reagent.

17. The method for quantitatively testing a flowing liquid for a colorless component thereof comprising periodically segregating a measured sample, adding thereto a test reagent effecting a change in the light absorption characteristic thereof proportional to said component, holding said sample quiescent to allow the entrained gases and heavier solids to separate and thereafter measuring the light absorption characteristics of the treated sample to quantitatively measure the concentration of said component.

18. The method of quantitatively testing flowing water for the hardness producing constituents thereof which includes segregating a measured sample of said water, adding thereto an excess of a reagent for precipitating the hardness producing constituents of said water, holding said sample quiescent to settle out the entrained gas and heavy solids, and thereafter measuring the change in the light absorption characteristics resulting from precipitation of the hardness producing constituents of said sample.

19. The method for quantitatively testing a flowing liquid for a colorless component thereof comprising periodically segregating a measured sample, forcibly injecting a test reagent into this sample in a manner to substantially uniformly distribute the reagent throughout the sample, said reagent being of a character to produce a change in the light absorption characteristics thereof proportional to said component, holding said sample a predetermined time for the completion of the reaction and measuring the light absorption characteristics of the treated sample to quantitatively measure the concentration of said component.

20. The method for determining the point of exhaustion of a zeolite water softener comprising periodically segregating a measured sample of the effluent water, forcibly injecting a test reagent into this sample in a manner to distribute the reagent therethrough, said reagent being capable of precipitating the hardness producing component of the water, holding said sample a predetermined time for the completion of said precipitation and measuring the light absorption characteristics of the treated sample to quantitatively measure the concentration of said component.

21. The method for quantitatively testing a flowing liquid for a colorless component thereof comprising conducting said liquid through a closed container, periodically interrupting the flow of liquid to segregate a sample in the container, mixing with the sample a test reagent of a character to produce a change in the light absorption characteristics thereof proportional to said component, holding said sample a predetermined time for the completion of said change, and measuring the light absorption characteristics of the treated sample to quantitatively measure the concentration of said component.

22. The method for quantitatively testing the effluent water of a zeolite water softener for hardness comprising conducting said water through a closed container, periodically interrupting the flow of water to segregate a sample in the container, forcibly injecting a test reagent into said sample in a manner to substantially uniformly distribute the reagent therethrough, said reagent being capable of precipitating the hardness producing component of the water, holding the sample a predetermined time for the completion of said precipitation, and measuring the light absorption characteristics of the treated sample to quantitatively measure the concentration of said component, and reestablishing the flow of liquid through the container.

ARTHUR L. RICHE.

CERTIFICATE OF CORRECTION.

Patent No. 2,253,049.   August 19, 1941.

ARTHUR L. RICHE.

It is hereby certified that error appears in the printed specification of the above numbered patent requiring correction as follows: Page 6, first column, line 17, claim 20, after the word "to" insert --substantially uniformly--; line 18, claim 20, for "therethrough" read --throughout the sample--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.